(12) United States Patent
Cook et al.

(10) Patent No.: US 10,920,851 B1
(45) Date of Patent: Feb. 16, 2021

(54) ZIPPER ASSEMBLY FOR A DRAPER BELT

(71) Applicant: CNH Industrial America LLC, New Holland, PA (US)

(72) Inventors: Joel Cook, Lititz, PA (US); Benjamin Kemmerer, Hamburg, PA (US); Herbert Farley, Elizabethtown, PA (US)

(73) Assignee: CNH Industrial America LLC, New Holland, PA (US)

( * ) Notice: Subject to any disclaimer, the term of this patent is extended or adjusted under 35 U.S.C. 154(b) by 0 days.

(21) Appl. No.: 16/737,477

(22) Filed: Jan. 8, 2020

(51) Int. Cl.
*F16G 3/10* (2006.01)
*B65G 15/36* (2006.01)
*B65G 15/42* (2006.01)

(52) U.S. Cl.
CPC ............... *F16G 3/10* (2013.01); *B65G 15/36* (2013.01); *B65G 15/42* (2013.01)

(58) Field of Classification Search
CPC ........ B65G 15/28; B65G 15/30; B65G 15/32; B65G 15/34; B65G 15/36; B65G 15/42; B65G 15/44; F16G 3/02; F16G 3/04; F16G 3/10
USPC ...................................................... 198/844.2
See application file for complete search history.

(56) References Cited

U.S. PATENT DOCUMENTS

| | | | |
|---|---|---|---|
| 2,873,501 A * | 2/1959 | Renner | B65G 15/40 198/819 |
| 4,827,579 A * | 5/1989 | Gisbourne | D21F 1/0054 139/383 AA |
| 5,246,100 A | 9/1993 | Stone et al. | |
| 6,314,624 B1 * | 11/2001 | Lin | A44B 19/308 24/421 |
| 8,002,110 B2 * | 8/2011 | DeGroot | B29C 66/4324 198/844.2 |
| 8,490,272 B1 | 7/2013 | Langsdorf et al. | |
| 9,456,663 B1 * | 10/2016 | Wheeler | A44B 19/301 |
| 2008/0271426 A1 * | 11/2008 | Lohrentz | A01D 41/14 56/153 |
| 2008/0276590 A1 * | 11/2008 | Sauerwein | A01D 41/14 56/153 |
| 2009/0288276 A1 * | 11/2009 | Dhanapal | A44B 19/306 24/421 |
| 2011/0192561 A1 * | 8/2011 | Breuer | D21F 1/0054 162/200 |
| 2011/0308221 A1 * | 12/2011 | Sauerwein | A01D 61/002 56/181 |

(Continued)

FOREIGN PATENT DOCUMENTS

| | | | |
|---|---|---|---|
| CN | 204186877 U | 3/2015 | |
| WO | 2016033801 A1 | 3/2016 | |
| WO | WO-2016033801 A1 * | 3/2016 | ............... F16G 3/00 |

*Primary Examiner* — Mark A Deuble
(74) *Attorney, Agent, or Firm* — Peter K. Zacharias; Patrick M. Sheldrake (57) ABSTRACT

The subject disclosure provides a draper belt assembly for an agricultural harvester that includes a draper belt and a zipper assembly along a length of the draper belt. The zipper assembly includes a first zipper track, a second zipper track complementary to the first zipper track, and a slider releasably connectable to the first zipper track and the second zipper track. The draper belt assembly further includes a lock for releasably securing the zipper assembly in a fixed position and a seal covering an upper surface of the first and second zipper tracks.

20 Claims, 8 Drawing Sheets

(56) References Cited

U.S. PATENT DOCUMENTS

2012/0048690 A1* 3/2012 Yuasa .................. F16G 3/00
  198/844.2
2019/0124843 A1* 5/2019 Augustine ............. A01D 57/20

* cited by examiner

ZIPPER ASSEMBLY FOR A DRAPER BELT

The exemplary embodiments of the present invention relate generally to a draper belt and, more specifically, to a header of a plant cutting machine having a draper belt that includes a zipper assembly.

BACKGROUND OF THE INVENTION

A plant cutting machine e.g., an agricultural harvester, such as, but not limited to, a combine or a windrower, generally includes a header operable for severing and collecting plant or crop material as the harvester is driven over a crop field. The header has a plant cutting mechanism for severing the plants or crops, e.g., a cutter bar having an elongate sickle mechanism that reciprocates sidewardly relative to a non-reciprocating guard structure. After crops are cut, they are collected inside the header and transported via a conveyor such as a draper belt towards a feederhouse located centrally of the header.

A conventional method for coupling or splicing the leading and trailing ends of a draper belt typically employs a pair of rigid connecting bars that fasten together to provide a clamping force against upstanding belt flaps or flanges provided at the leading and trailing ends of the draper belt. However, with this method it is difficult to align the connecting bars properly, e.g., holes for fasteners and the connecting bars oftentimes deform and must be reshaped back into alignment. This method also creates poor sealing at the edges of the belt as the connecting bars are too bulky to extend to the edges of the belt covered by debris shields/seals.

Another conventional construction of coupling the ends of a draper belt involves a laced splice at the leading and trailing ends of the draper belt which involves time consuming lacing of the ends of the draper belt. Still another conventional construction of the draper belt involves the use of a fixed length, endless draper belt.

Further, draper belts based on conventional construction are challenging and time-consuming to install. As such, there remains a need for a means of efficiently repairing and constructing draper belts that overcome the drawbacks of conventional constructions.

BRIEF SUMMARY OF THE INVENTION

In accordance with an exemplary embodiment of the subject disclosure, there is provided a draper belt assembly for an agricultural harvester header that includes a draper belt, a zipper assembly, a lock, and a seal. The zipper assembly is positioned along a length of the draper belt and includes a first zipper track, a second zipper track complementary to the first zipper track, and a slider releasably connectable to the first zipper track and the second zipper track. The lock releasably secures the zipper assembly in a fixed position. The seal covers an upper surface of the first and second zipper tracks.

In certain exemplary embodiments, the seal includes a plurality of bristles. In other embodiments, the seal overlaps an outer surface of the draper belt to cover the first zipper track and the second zipper track upon engagement of the slider to the first zipper track and the second zipper track. The seal provides a watertight seal covering the first zipper track and the second zipper track. In other embodiments, the seal includes a first seal portion coextensive with the first zipper track and a second seal portion coextensive with the second zipper track. The first seal portion and second seal portion overlap upon engagement of the first and second zipper tracks. In certain embodiments, the seal includes a plurality of seal segments each of unitary construction with the zipper assembly.

In other exemplary embodiments, the draper belt includes a plurality of spaced apart latches positioned adjacent along a length of one of the first and second zipper tracks for receiving the lock.

In certain embodiments, the first zipper track includes a fastener for securing the first zipper track to a first end of the draper belt, and the second zipper track includes a fastener for securing the second zipper track to a second end of the draper belt. In other embodiments, the fastener is at least one of an adhesive, a screw, a staple, a pin, and a rivet.

Other features and advantages of the subject disclosure will be apparent from the following more detail description of the exemplary embodiments.

BRIEF DESCRIPTION OF THE DRAWINGS

The foregoing summary, as well as the following detailed description of the exemplary embodiments of the subject disclosure, will be better understood when read in conjunction with the appended drawings. For the purpose of illustrating the present disclosure, there are shown in the drawings exemplary embodiments. It should be understood, however, that the subject application is not limited to the precise arrangements and instrumentalities shown.

DETAILED DESCRIPTION OF THE DRAWINGS

Reference will now be made in detail to the various exemplary embodiments of the subject disclosure illustrated in the accompanying drawings. Wherever possible, the same or like reference numbers will be used throughout the drawings to refer to the same or like features. It should be noted that the drawings are in simplified form and are not drawn to precise scale. Certain terminology is used in the following description for convenience only and is not limiting. Directional terms such as top, bottom, left, right, above, below and diagonal, are used with respect to the accompanying drawings. The term "distal" shall mean away from the center of a body. The term "proximal" shall mean closer towards the center of a body and/or away from the "distal" end. The words "inwardly" and "outwardly" refer to directions toward and away from, respectively, the geometric center of the identified element and designated parts thereof. Such directional terms used in conjunction with the following description of the drawings should not be construed to limit the scope of the subject application in any manner not explicitly set forth. Additionally, the term "a," as used in the specification, means "at least one." The terminology includes the words above specifically mentioned, derivatives thereof, and words of similar import.

The terms "grain," "ear," "stalk," "leaf," and "crop material" are used throughout the specification for convenience and it should be understood that these terms are not intended to be limiting. Thus, "grain" refers to that part of a crop which is harvested and separated from discardable portions of the crop material. The header of the subject application is applicable to a variety of crops, including but not limited to wheat, soybeans and small grains. The terms "debris," "material other than grain," and the like are used interchangeably.

"About" as used herein when referring to a measurable value such as an amount, a temporal duration, and the like, is meant to encompass variations of ±20%, ±10%, ±5%, ±1%, or ±0.1% from the specified value, as such variations are appropriate.

"Substantially" as used herein shall mean considerable in extent, largely but not wholly that which is specified, or an appropriate variation therefrom as is acceptable within the field of art.

Throughout the subject application, various aspects thereof can be presented in a range format. It should be understood that the description in range format is merely for convenience and brevity and should not be construed as an inflexible limitation on the scope of the subject disclosure. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 2.7, 3, 4, 5, 5.3, and 6. This applies regardless of the breadth of the range.

Furthermore, the described features, advantages and characteristics of the exemplary embodiments of the subject disclosure may be combined in any suitable manner in one or more embodiments. One skilled in the relevant art will recognize, in light of the description herein, that the subject disclosure can be practiced without one or more of the specific features or advantages of a particular exemplary embodiment. In other instances, additional features and advantages may be recognized in certain embodiments that may not be present in all exemplary embodiments of the present disclosure.

Figure 1:
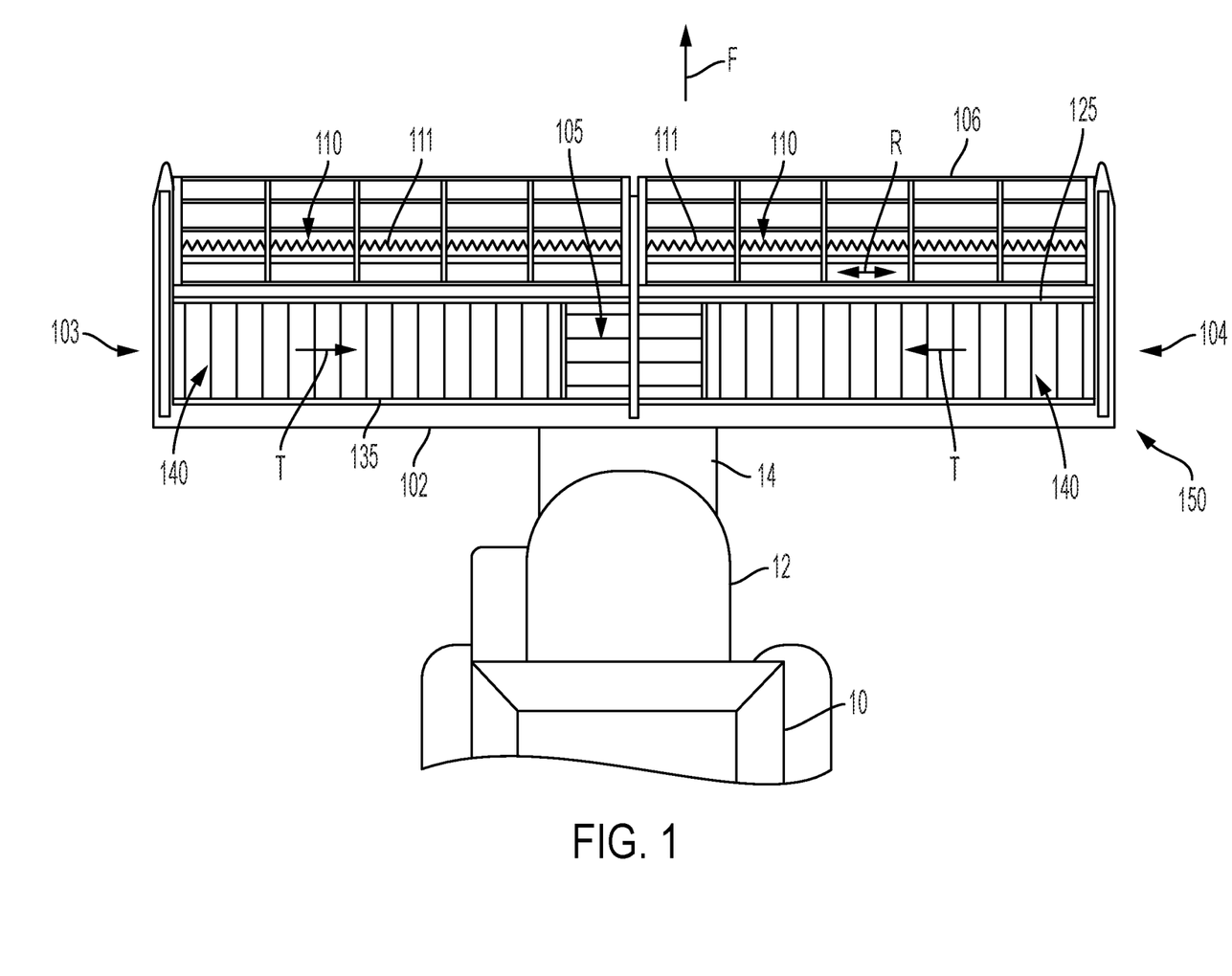
FIG. 1 is a top view of an agricultural vehicle in the form of a combine harvester in accordance with an exemplary embodiment of the subject disclosure.

Referring now to the drawings, and more particularly to FIG. 1, there is shown an exemplary embodiment of an agricultural vehicle 10 in the form of, e.g., a combine harvester which generally includes a chassis 12, a feeder housing or feederhouse 14, and an attachment in the form of a header 150. Typically, the combine harvester 10 will include additional internal systems for the separation and handling of collected crop material. However, these additional systems are not essential for a full and proper understanding of the subject disclosure. It should be appreciated that the draper belt described and illustrated herein does not necessarily need to be included on combine harvesters, but can be incorporated in other agricultural vehicles or devices having draper belts.

The header 150 is coupled to, and supported by, the chassis 12 of the agricultural vehicle 10 by, for example, coupling to the feeder housing 14. In the exemplary embodiment shown, the header 150 is in the form of a draper header to harvest bushy or fluffy crop material. The header 150 has a frame 102 coupled to the chassis 12 by coupling to the feeder housing 14 and a pair of opposed lateral ends 103, 104. The header 150 may support one or more flexible cutter bar assemblies 110 with reciprocating knives 111 to cut crop material as the agricultural vehicle 10 travels in a forward direction, denoted by arrow F. The reciprocating knives 111, which may be referred to as cutting elements, can be reciprocated back-and-forth in a lateral direction, denoted by arrow R, relative to the forward direction F in a known manner, e.g., by a wobble box, epicyclic drive, etc. Exemplary cutting elements applicable to the present exemplary embodiments are disclosed, e.g., in U.S. Pat. Nos. 7,730,709 and 8,151,547, the entire disclosures of which are incorporated by reference herein in their entirety for all purposes.

The header 150 may further include a center feed belt 105 and/or a center auger that conveys the crop material into the feeder housing 14. The header 150 may also include one or more lateral, flexible draper belts 140 that are positioned rearwardly of the cutter bar assemblies 110 and travel, i.e. rotate, in opposing directions of travel, denoted by each arrow "T", in order to convey crop material inwardly to the center feed belt 105 and thereby the feeder housing 14. With reference to the forward direction F, the draper belt 140 includes a fore end 125 and an aft end 135. The header 150 may also include a rotating reel 106 with tines or the like to sweep the crop material inwardly towards the draper belts 140.

In accordance with an aspect of the subject disclosure, an outer surface 223 of the draper belt 140 includes a plurality of spaced apart lugs or ribs 206. Draper belts 140 are provided with lugs 206 to facilitate gripping and transporting the cut crop in the travelling direction of the draper belt.

Figure 2:
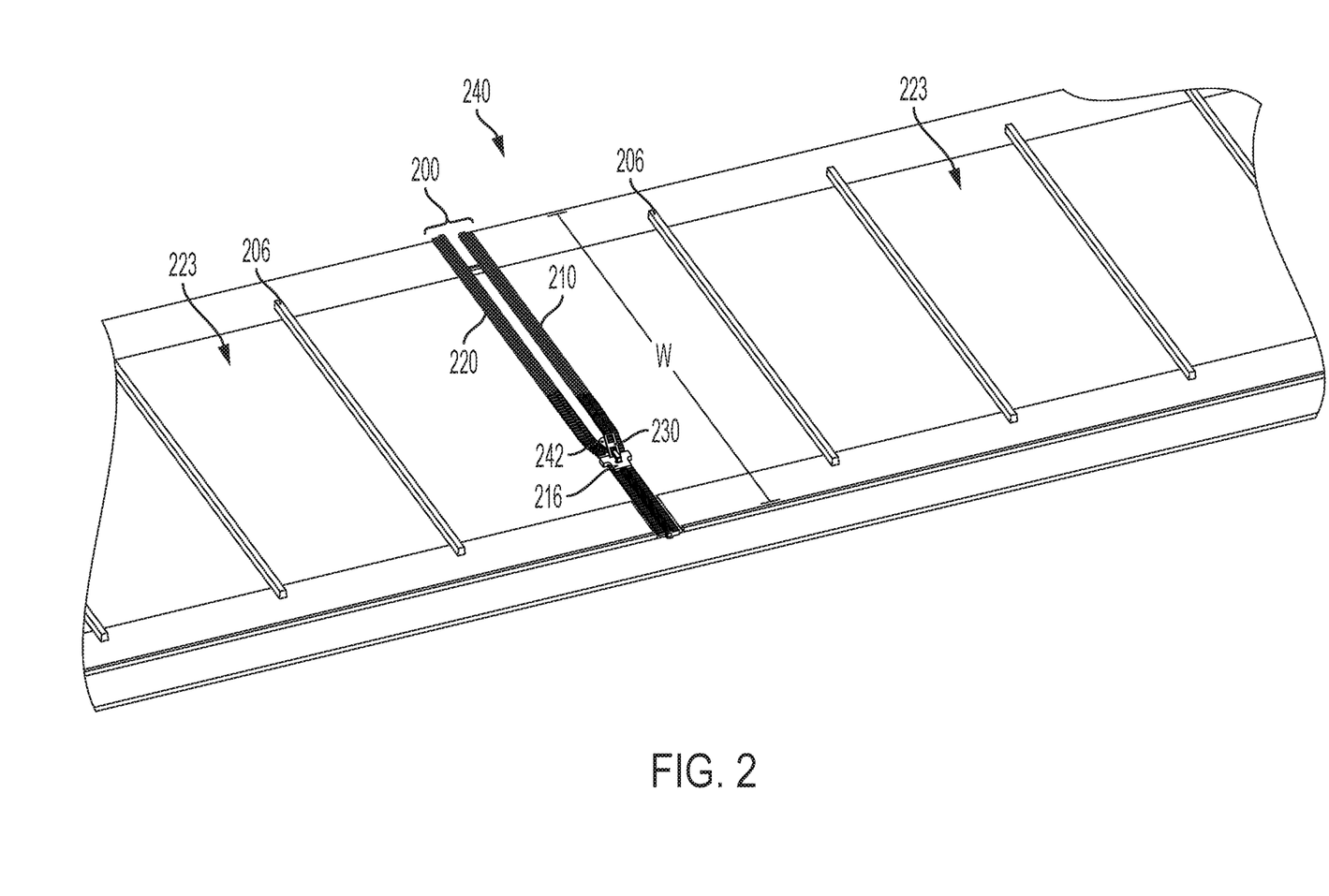
FIG. 2 is a perspective view of a zipper assembly according to an exemplary embodiment of the subject disclosure.

Referring to FIG. 2, there is shown a portion of a first exemplary embodiment of a zipper assembly 200 along a length of a draper belt 240. The zipper assembly 200 includes a first zipper track 210 and a second zipper track 220 complementary to the first zipper track 210. The first zipper track 210 and the second zipper track 220 extend across a complete width W of the draper belt 240. However, in accordance with other aspects, the first and second zipper tracks can extend less than a complete width W of the draper belt e.g., ½, ¾, ⅔, ⅓, etc. of the draper belt. In this particular embodiment, as shown in FIG. 3A, the first zipper track 310 has a series of elements 312 in the form of a hollow and the second zipper track 320 has a second series of elements 314 in the form of a hook shaped to fit inside and be received by the hollow.

Figure 3A:
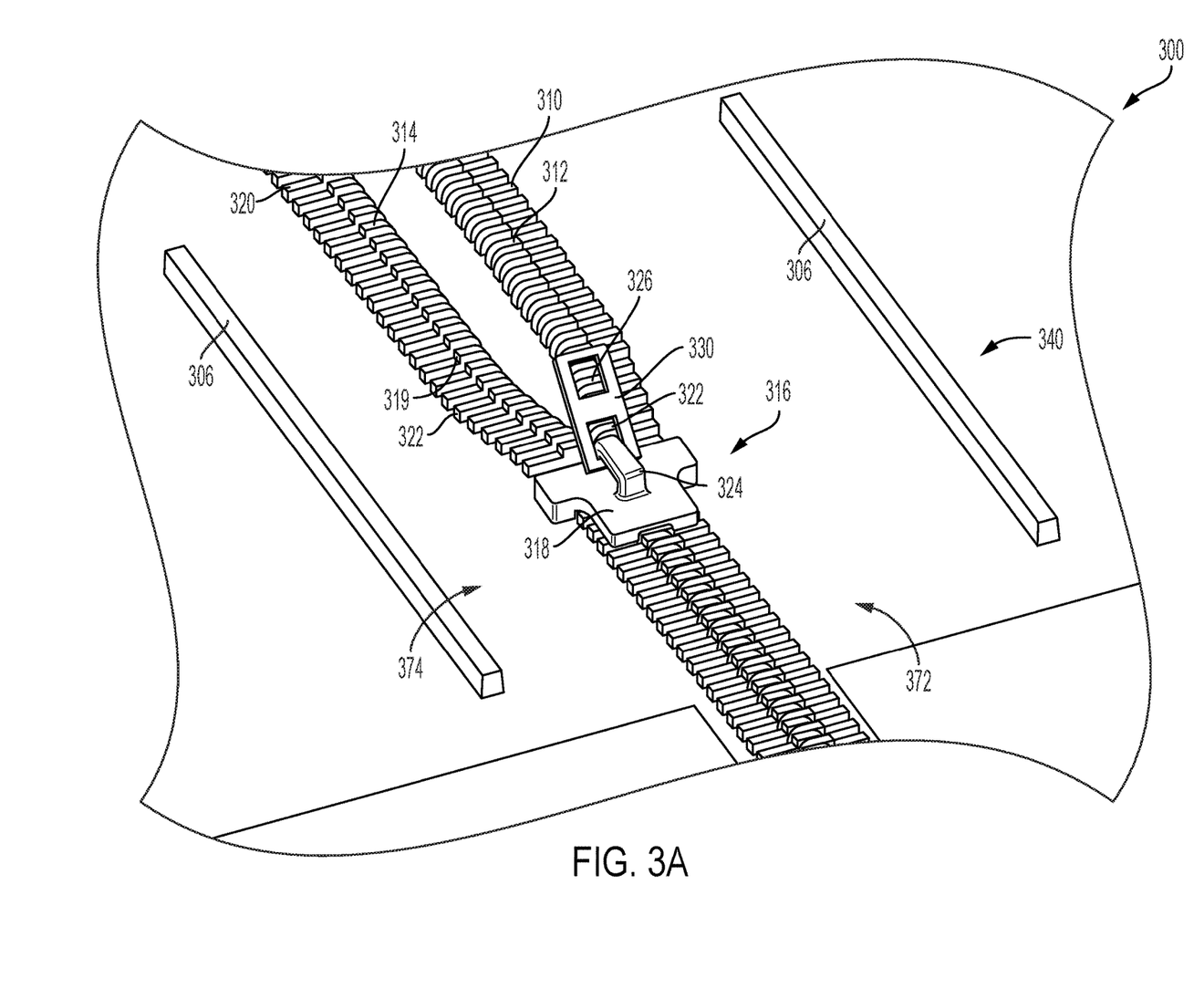
FIG. 3A is an enlarged partial perspective view of a zipper assembly in accordance with another exemplary embodiment of the subject disclosure.
Figure 3B:
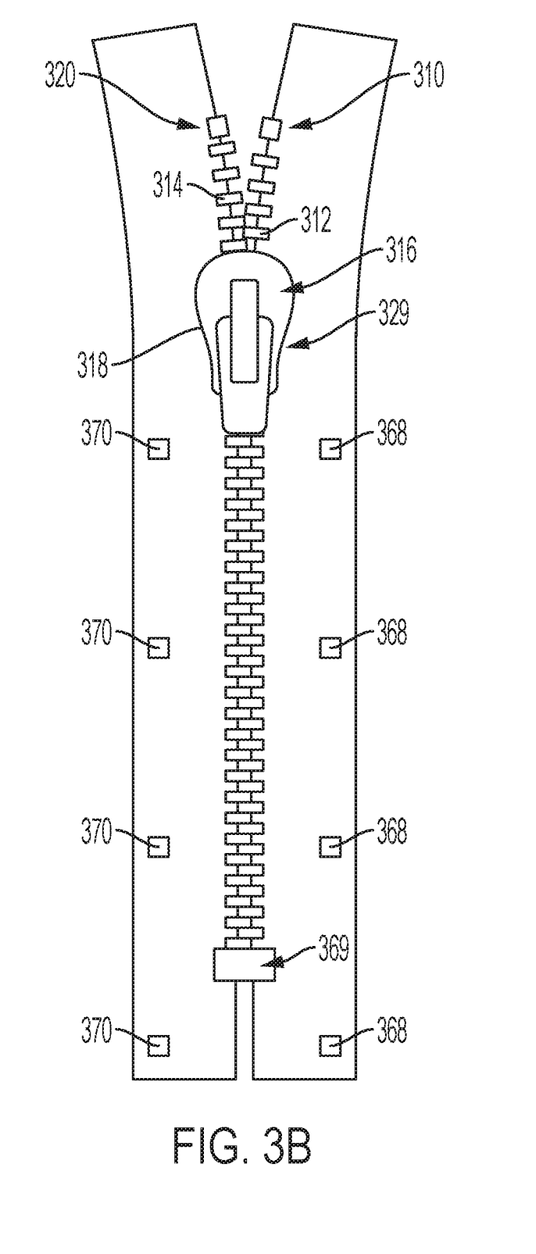
FIG. 3B is a top plan view of a zipper assembly according to another exemplary embodiment of the subject disclosure.

As shown in FIGS. 3A and 3B, the elements to the first zipper track 310 and the second zipper track 320 can be in the form of interlocking and complimentary-shaped teeth 312, 314, which can be composed of a metal or hard plastic material capable of withstanding significant force and providing an airtight and/or a waterproof seal. In other words, each of the first zipper track 310 and the second zipper track 320 include a plurality of teeth where a set of teeth on one zipper track is engageable with a complimentary set of teeth on another zipper track to form a mesh of linked zipper tracks. Other forms of complementary elements (e.g., interlocking elements) can be provided as well.

In accordance with an aspect of the first exemplary embodiment, the first zipper track 310 includes a fastener 368 (FIG. 3B) for securing the first zipper track 310 to a first end 372 of the draper belt 340. Similarly, the second zipper track 320 includes a fastener 370 for securing the second zipper track 320 to a second end 374 of the draper belt 340. The fasteners 368, 370 can be configured e.g., as mounting bolts. The mounting bolts 368, 370 are e.g., elongate and generally cylindrical, however, other cross-sectional shapes are contemplated including oval, rectangle, and irregular shapes. The mounting bolts may have any desired length sufficient for their intended purpose. Although the fasteners 368, 370 are configured as a mounting bolt, the fasteners can alternatively be any other fastener suitable for the intended purpose, such as an adhesive, a staple, a pin, and/or a rivet. The mounting bolts 368, 370 secure the respective first and second zipper tracks 310, 320 to the draper belt 340.

In accordance with another aspect of the exemplary embodiment, a portion of the first and second zipper tracks 310, 320 is vulcanized to the draper belt 340. That is, during manufacturing the rubber is cured over the zipper tracks. Alternatively, the first zipper track 310 and the second zipper track 320 can be retrofitted to existing draper belts. For example, the zipper tracks can be seamed, stapled, welded or otherwise adhered to an existing draper belt to form a zipper mechanism.

The zipper assembly 300 further includes a slider 316 releasably connectable to the first zipper track 310 and the second zipper track 320. Specifically, the slider 316 is configured to engage the first zipper track 310 with the second zipper track 320, thereby inserting elements 314 of the second zipper track 320 into the hollows 312 of the first zipper track 310, upon moving the slider 316 upward, as oriented in FIGS. 3A and 3B. Moving the slider 316 downwardly (as oriented in FIGS. 3A and 3B), disengages the first zipper track 310 from the second zipper track 320.

In accordance with an aspect of this exemplary embodiment, the slider 316 includes a slider body 318 and a pull tab 330. The slider body 318 is shaped to receive the first zipper track 310 and the second zipper track 320 at an inlet 319 and merge the first and second zipper tracks 310, 320. For example, the slider body 318 can contain two channels at the inlet 319 that are shaped to merge and interlock the elements to the first and second zipper tracks at a central location of the body when the slider is advanced. It is to be understood that other configurations can be provided according to the subject disclosure in order to provide a heavy-duty zipper. The slider body 318 may be permanently housed along the first zipper track 310 or the second zipper track 320 via a retainer box 369 (FIG. 3B) along the bottom of the respective zipper tracks 310, 320 to prevent the slider body from sliding off the respective zipper tracks.

In this exemplary embodiment, the pull tab 330 is shaped to allow the slider body 318 to be manually manipulated. Additionally, the pull tab may be configured to have a shape of an oval, a circle, a square, a rectangle, and/or a triangle, etc. The pull tab 330 includes a first aperture 322 along a bottom portion of the pull tab 330 to engage a bracket 324 located on the slider body 318 and a second aperture 326 which can be used, for example, in conjunction with a lock for the slider 316, as further discussed below.

In accordance with an exemplary embodiment, the zipper assembly 300 is oriented such that the slider bracket 324 and pull tab 330 are disposed along an outer surface of the draper belt 340. Alternatively, the zipper assembly 300 can be oriented such that the slider bracket 324 and pull tab 330 are disposed along a lower surface or undersurface of the draper belt 340. Such an alternative orientation advantageously provides a lower profile, with the pull tab 330 and bracket 324 positioned along the bottom of the draper belt 340 so as not to interfere with the transport of crop material along the outer surface of the draper belt 340.

In accordance with an aspect of the subject disclosure, the zipper assembly can be provided with a low profile. For example, as shown in FIG. 3A, the slider body 318, and hence the zipper assembly 300, has a profile lower than the plurality of spaced apart lugs or ribs 306 that extend along a width W of the draper belt 340. That is, an overall height of the zipper assembly is less than or lower than an overall height of the lugs or ribs 306.

In operation, when the slider 216 is moved in a downwardly direction, as oriented in FIG. 2, (e.g., by an operator pulling the pull tab 230) the linked first zipper track and second zipper track are separated from one another. Alternatively, when the slider 216 is moved in an upwardly direction, as oriented in FIG. 2, the linked first zipper track and second zipper track are brought toward one another to form a tight fit, for example, that is sufficient to secure the first zipper track to the second zipper track.

As shown in FIG. 3B, the slider body 318 in this exemplary embodiment includes a flange 329 to provide increased surface area and to allow easier manual manipulation of the slider 316.

Alternatively, multiple sliders can be utilized along the first and second zipper tracks. When two or more sliders are utilized, the sliders can be locked together through a locking mechanism (not shown) integrally formed with the respective sliders or with a lock looped through the first or second aperture 322, 326 located on the pull tab of the slider 316.

Referring back to FIG. 2, in accordance with an aspect of the subject disclosure, the draper belt assembly includes a lock 242 for releasably securing the zipper assembly 200 in a fixed position along a length of the draper belt, typically the aft end of the belt.

Figure 4:
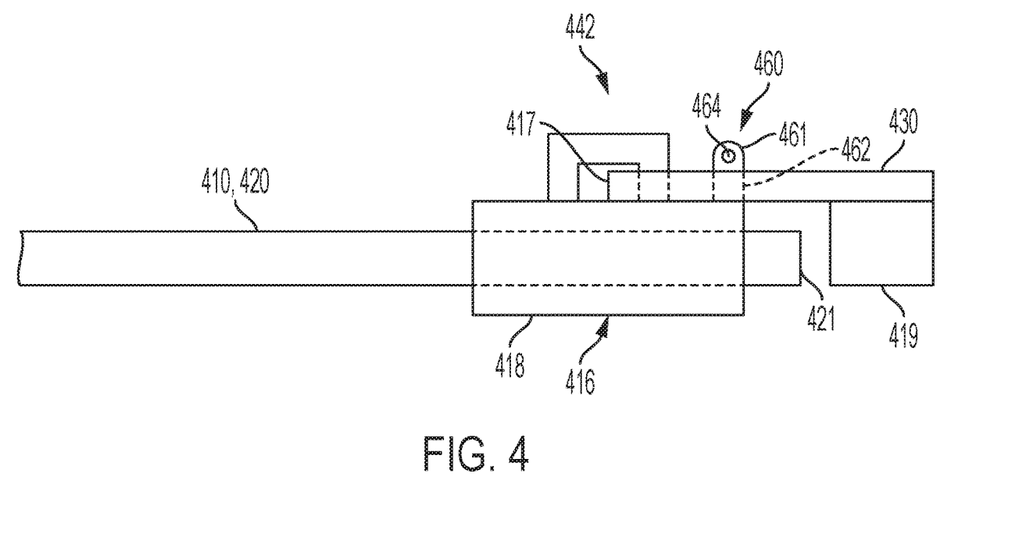
FIG. 4 is a partial schematic view of a locking pin assembly according to an exemplary embodiment of the subject disclosure.

As shown in FIG. 4, the lock 442 is part of the slider 416 and includes a pull tab or toggle 430 having a proximal end pivotably connected at 417 to an upper surface of the slider body 418. A locking flange 419 is affixed to and downwardly depends from a distal end of the pull tab 430. When in the lock 442 is in the locked position shown in FIG. 4, the locking flange is configured to butt against the aft end 421 of the first and second zipper tracks 410, 420 to prevent unzipping of the slider 416 along the first and second zipper tracks. The lock 442 further comprises a locking pin assembly 460 having a locking tab 461 projecting upwardly from the upper surface of the slider body and extendable through a slot 462 provided in the pull tab 430. The upper end of the locking tab 461 is provided with a hole for releasably receiving a locking pin 464.

In order to release the lock 442 from the locked position shown in FIG. 4, the locking pin 464 is removed from the hole in the locking tab 461 and the pull tab 430 is grasped and lifted upwardly until the locking flange 419 clears the aft end 421 of the first and second zipper tracks 410, 420. With the locking flange sufficiently raised, a user can pull on the pull tab 430 to move the slider 416 in the direction of arrow 470 to unzip the first and second zipper tracks. The locking pin 464 is preferably configured as an L-shaped pin or has an enlarged head at one end thereof in order to prevent the pin from falling from the hole in the locking tab 461 when the lock 442 is in the locked position.

Figure 5:
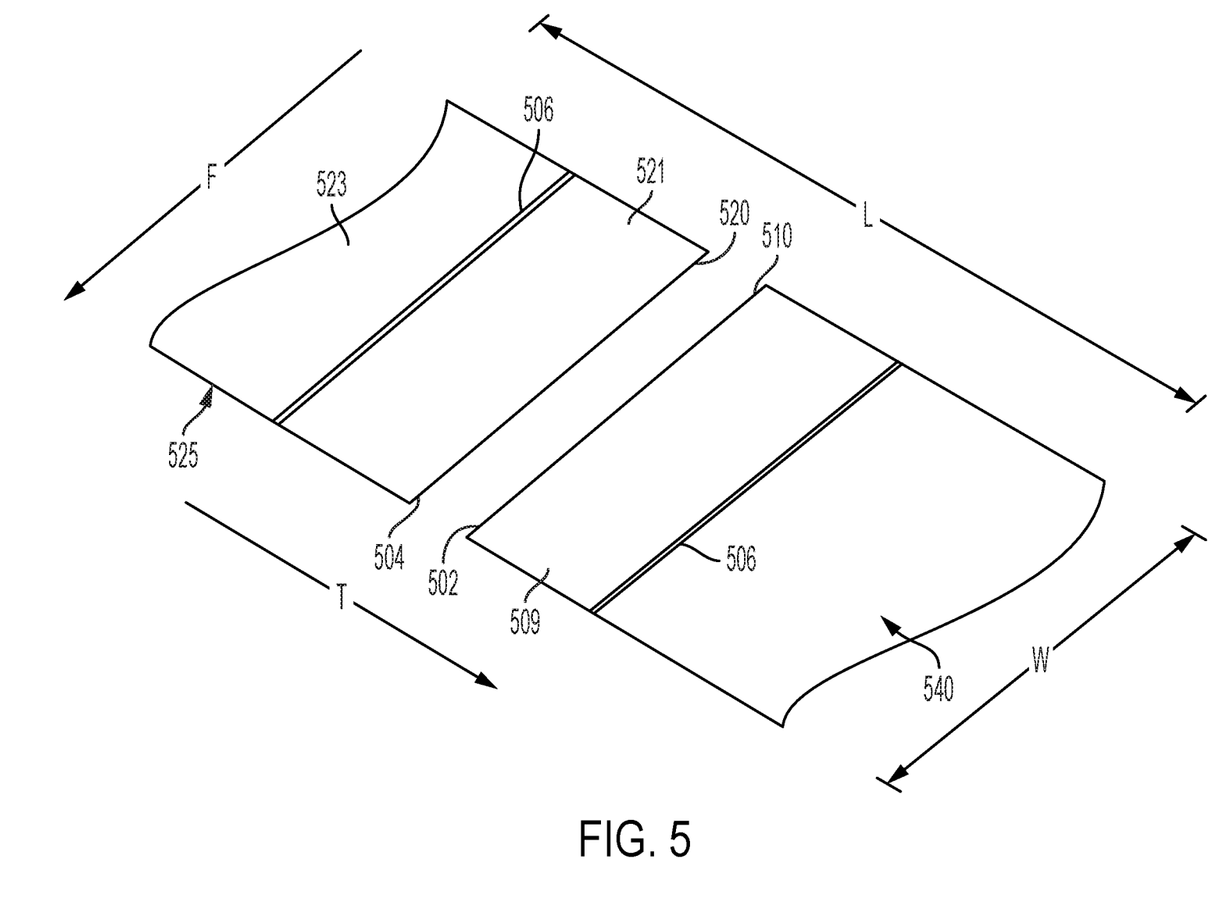
FIG. 5 is a partial view of a draper belt according to another exemplary embodiment of the subject disclosure.

Referring now to FIG. 5, the location of the first zipper track 510 and the second zipper track 520 on the draper belt 540 is shown along a length L of the draper belt 540. In this exemplary embodiment, the draper belt 540 is a lateral draper belt, though the subject disclosure can be provided on any draper belt. FIG. 5 depicts the draper belt 540 in an unassembled state, in which the elements to the zipper tracks and the slider have been omitted for purposes of clarity.

In FIG. 5, the fore end 525 of the unassembled draper belt 540 includes a leading edge 502 and a trailing edge 504. An outer surface 523 of the draper belt is shown in FIG. 5 for transporting crop material. There is also a lower surface opposite the outer surface 523 for contacting a first roller and a second roller (not shown). Upon connection of the first zipper track 510 and the second zipper track 520, the rollers of the header direct the draper belt 540 to travel in direction T. The leading edge 502 defines an edge to a leading section 509, and the trailing edge 504 defines an edge to a trailing section 521. A plurality of spaced apart lugs or ribs 506 extend perpendicularly or substantially parallel from the leading edge 502 and the trailing edge 504 across, or substantially across, a width W of the draper belt 540.

Figure 6:
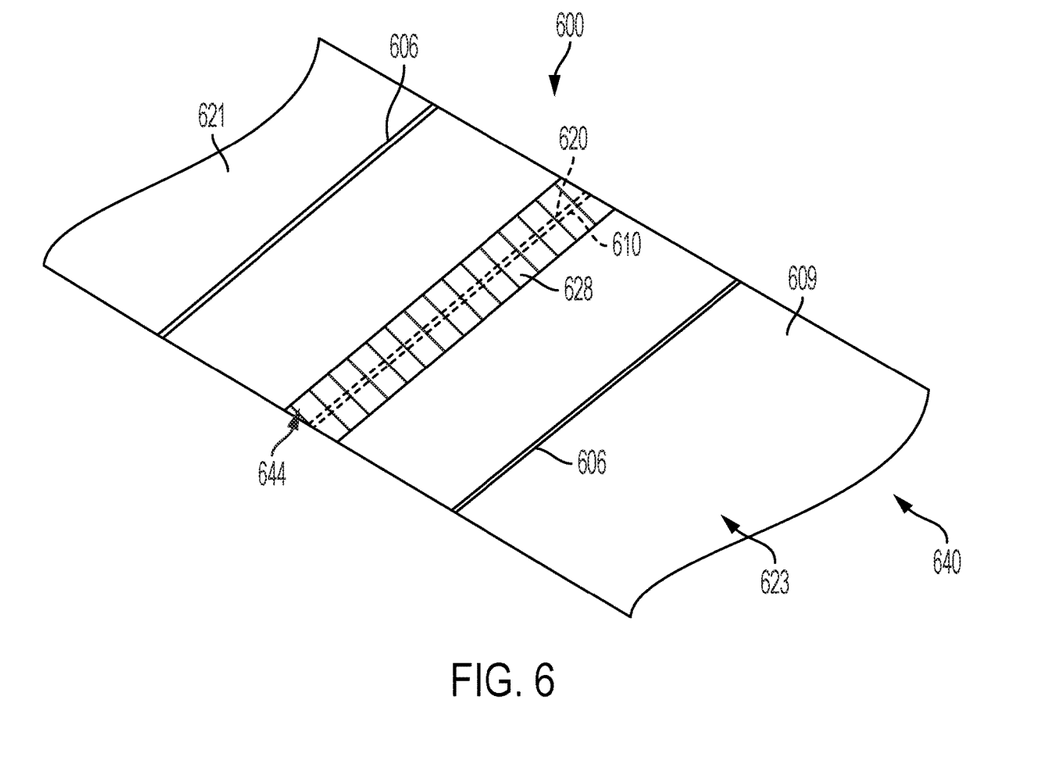
FIG. 6 is a partial view of a draper belt according to another exemplary embodiment of the subject disclosure.

FIG. 6 depicts a draper belt 640 having an outer surface 623 and a zipper assembly 600 in which the first zipper track 610 and the second zipper track 620 are connected, and the leading section 609 is in sealed engagement with the trailing section 621. In accordance with an exemplary aspect, the sealed engagement can be an airtight and/or a waterproof seal. In this particular embodiment, the slider and pull tab to the zipper assembly are disposed along the bottom surface of the draper belt and are thus not visible from a top plan view.

As shown in FIG. 6, a seal 628 extends from the leading section 609 to overlap the outer surface 623 of the draper belt and cover an upper surface 644 of the first zipper track 610 and the second zipper track 620 upon engagement of the slider (not shown) to the first zipper track 610 and the second zipper track 620. In this particular embodiment, the seal comprises the same material as the draper belt, though other watertight, flexible polymeric materials can form the seal e.g., rubbers, elastomers, or other flexible synthetic materials. The seal 628 lies flush against the outer surface 623 of the draper belt to provide a low profile, lower than the profile of the lugs 606. Alternatively, as shown in FIG. 7A, described below, the seal can be releasably secured to the draper belt by Velcro® hook and loop type fasteners.

In an aspect of the subject disclosure, the seal 628 comprises a plurality of bristles. Alternatively, it can be formed from other applicable materials so long as it functions to prevent debris or other objects from entering the space between the first zipper track and the second zipper track. The seal 628 provides a watertight seal covering the first zipper track 610 and the second zipper track 620.

The seal disclosed in FIG. 6 is an exemplary embodiment of a seal applicable to the subject disclosure, and other arrangements can be provided in accordance with the subject disclosure. For example, a plurality of seal segments or portions can be provided which are of unitary construction with the zipper assembly, such as a seal portion extending from and/or coextensive with the leading section 609 and a seal portion extending from and/or coextensive with the trailing section 621 that overlap with each other and the first and second zipper tracks.

Figure 7A:
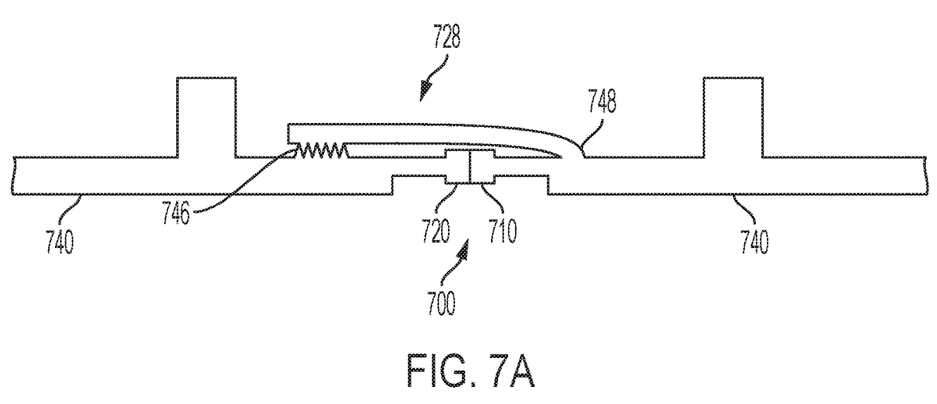
FIG. 7A is a partial view of a seal according to an exemplary embodiment of the subject disclosure.

As shown in FIG. 7A, in accordance with an exemplary aspect of the subject disclosure, the seal 728 of zipper assembly 700 can be constructed generally as a flap that covers the first and second zipper tracks 710, 720. In this regard, the includes a first seal edge 746 adjacent the first zipper track 710 and a second seal edge 748 adjacent the second zipper track 720. According to an aspect, the first seal edge 746 can be fixedly attached to a draper belt 740 by sewing, vulcanizing, or the like, and the second seal edge 748 can be releasably attached to the draper belt by suitable releasable fasteners including, without limitation, Velcro® hook and loop type fasteners. It is also contemplated that first seal edge can likewise be releasably attached to the draper belt 740 by suitable releasable fasteners.

Figure 7B:
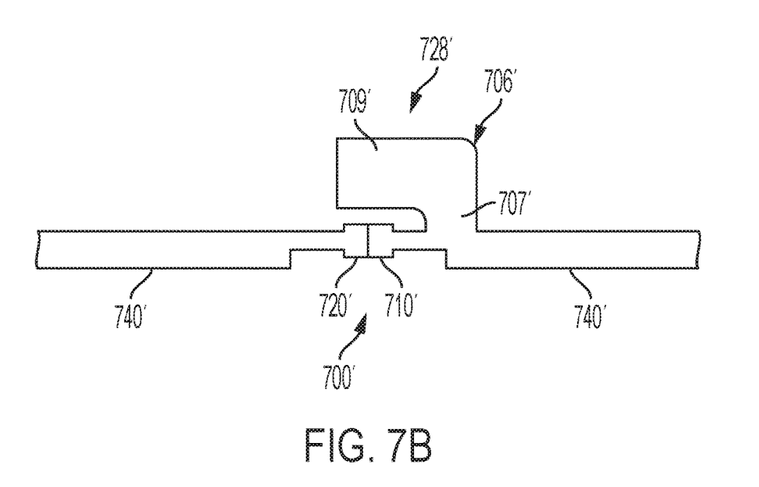
FIG. 7B is a partial view of a seal according to another exemplary embodiment of the subject disclosure.

As shown in FIG. 7B, the seal 728' of zipper assembly 700' can be of unitary construction e.g., integrally formed or wholly integrated, with the belt 740'. Specifically, the seal 728' can be an enlarged belt rib or lug 706' having a first upstanding portion 707' and a laterally extending second portion 709'. According to an aspect, the second portion 709' closely overlies and fully covers the first and second zipper tracks 710', 720' to prevent ingress of debris into the zipper assembly.

It will be appreciated by those skilled in the art that changes could be made to the exemplary embodiments described above without departing from the broad inventive concept thereof. It is to be understood, therefore, that this disclosure is not limited to the particular exemplary embodiments disclosed, but it is intended to cover modifications within the spirit and scope of the subject disclosure as defined by the appended claims.

We claim:

1. A draper belt assembly for an agricultural harvester header comprising:
   a draper belt;
   a zipper assembly along a length of the draper belt, the zipper assembly including:
      a first zipper track,
      a second zipper track complementary to the first zipper track, and
      a slider releasably connectable to the first zipper track and the second zipper track; and
   a seal covering an upper surface of the first and second zipper tracks.

2. A draper belt assembly for an agricultural harvester header comprising:
   a draper belt;
   a zipper assembly along a length of the draper belt, the zipper assembly including:
      a first zipper track,
      a second zipper track complementary to the first zipper track, and
      a slider releasably connectable to the first zipper track and the second zipper track;
   a lock for releasably securing the zipper assembly in a fixed position; and
   a seal covering an upper surface of the first and second zipper tracks.

3. The draper belt assembly of claim 2, wherein the draper belt comprises:
   an outer surface that includes a plurality of spaced apart lugs or ribs, and wherein the zipper assembly has a lower profile than the plurality of spaced apart lugs or ribs.

4. The draper belt assembly of claim 2, wherein the first zipper track and second zipper track extend across a complete width of the draper belt.

5. The draper belt assembly of claim 2, wherein the seal comprises a plurality of bristles.

6. The draper belt assembly of claim 2, wherein the seal overlaps an outer surface of the draper belt to cover the first zipper track and the second zipper track upon engagement of the slider to the first zipper track and the second zipper track.

7. The draper belt assembly of claim 2, wherein the seal provides a watertight seal covering the first zipper track and the second zipper track.

8. The draper belt assembly of claim 2, wherein the seal includes a first seal edge adjacent the first zipper track and a second seal edge adjacent the second zipper track.

9. The draper belt assembly of claim 8, wherein the first seal edge is fixedly attached to the draper belt and second seal edge is releasably attached to the draper belt.

10. The draper belt assembly of claim 2, wherein the seal comprises a plurality of seal segments each of unitary construction with the zipper assembly.

11. The draper belt assembly of claim 2, wherein the seal comprises enlarged belt lug having a first upstanding portion and a laterally extending second portion overlying the first and second zipper tracks.

12. The draper belt assembly of claim 2, wherein the lock comprises:
- a pull tab having a proximal end and a distal end, wherein the proximal end is pivotably connected to an upper surface of the slider;
- a downwardly depending locking flange affixed to the distal end of the pull tab; and
- a locking pin assembly comprising:
  - a locking tab projecting upwardly from the slider and extendable through a slot provided in the pull tab; and
  - a locking pin releasably received in the locking tab.

13. The draper belt assembly of claim 2, wherein the first zipper track includes a fastener for securing the first zipper track to a first end of the draper belt, and the second zipper track includes a fastener for securing the second zipper track to a second end of the draper belt.

14. The draper belt assembly of claim 13, wherein the fastener is at least one of an adhesive, a screw, a staple, a pin, and a rivet.

15. The draper belt assembly of claim 2, wherein a portion of the first zipper track and second zipper track are vulcanized to the draper belt.

16. A header of an agricultural harvester comprising the draper belt assembly of claim 2.

17. A harvester comprising the header of claim 16.

18. A draper belt assembly for an agricultural harvester header comprising:
- a draper belt;
- a zipper assembly along a length of the draper belt, the zipper assembly including:
  - a first zipper track,
  - a second zipper track complementary to the first zipper track, and
  - a slider releasably connectable to the first zipper track and the second zipper track; and
- a lock for releasably securing the zipper assembly in a fixed position,
wherein a portion of the first zipper track and second zipper track are vulcanized to the draper belt.

19. The draper belt assembly of claim 18, further comprising a seal covering an upper surface of the first and second zipper tracks.

20. The draper belt assembly of claim 18, wherein the draper belt comprises:
- an outer surface that includes a plurality of spaced apart lugs or ribs, and wherein the zipper assembly has a lower profile than the plurality of spaced apart lugs or ribs.

\* \* \* \* \*